(12) United States Patent
Yamaki

(10) Patent No.: US 6,595,850 B2
(45) Date of Patent: *Jul. 22, 2003

(54) VIDEO GAME MACHINE, VIDEO-GAME DISPLAY CONTROL METHOD, AND COMPUTER-READABLE RECORDING MEDIUM CONTAINING VIDEO GAME PROGRAM

(75) Inventor: Yukiko Yamaki, Sapporo (JP)

(73) Assignee: Konami Co., Ltd., Hyogo-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/339,754

(22) Filed: Jun. 24, 1999

(65) Prior Publication Data

US 2002/0077176 A1 Jun. 20, 2002

(30) Foreign Application Priority Data

Jun. 29, 1998 (JP) .......................................... 10-182151

(51) Int. Cl.⁷ ................................................ A63F 13/00
(52) U.S. Cl. ................................ 463/1; 463/7; 463/30; 463/32; 434/267
(58) Field of Search ........................... 463/30, 31, 32, 463/33; 273/153; 434/262, 267

(56) References Cited

U.S. PATENT DOCUMENTS

| | | | | |
|---|---|---|---|---|
| 4,738,451 A | * | 4/1988 | Logg ........................ | 273/153 |
| 5,556,100 A | * | 9/1996 | Taylor et al. .............. | 273/249 |
| 5,649,862 A | * | 7/1997 | Sakaguchi et al. ......... | 463/44 |
| 5,678,571 A | * | 10/1997 | Brown ...................... | 128/898 |
| 5,720,663 A | * | 2/1998 | Nakatani et al. .......... | 463/23 |
| 5,730,654 A | * | 3/1998 | Brown ...................... | 463/1 |
| 5,850,229 A | * | 12/1998 | Edelsbrunner et al. ..... | 345/473 |
| 5,918,603 A | * | 7/1999 | Brown ...................... | 128/897 |
| 5,931,734 A | * | 8/1999 | Nakatani et al. .......... | 463/23 |
| 6,186,145 B1 | * | 2/2001 | Brown ...................... | 128/897 |
| 6,267,674 B1 | * | 7/2001 | Kondo et al. ............. | 463/32 |

OTHER PUBLICATIONS

Will Marlow, Life Force (game review), 1988, Konami.*

Gauntlet instruction booklet 1985, 1987 Atari Games, pp 1–6.*

"Rex Ronan for smoking Prevention", pp 1–5, copyright 1998 Click Health, Inc. [online], <http://www.clickhealth.com/prodsmok.htm>.*

(List continued on next page.)

Primary Examiner—S. Thomas Hughes
Assistant Examiner—Alex F. R. P. Rada, II
(74) Attorney, Agent, or Firm—Jordan and Hamburg LLP

(57) ABSTRACT

A video game machine includes a display unit for displaying a game screen based on a video game in which a leading character fights to attack enemy characters, a display control unit for displaying the leading character and enemy characters on the game screen, an operation unit for outputting operation signals in accordance with external operations, an attack control unit for controlling the leading character on the game screen so that the leading character uses weapon items in accordance with the operation signals to attack the enemy characters, and an enemy-character generating unit for newly generating the enemy characters at a predetermined position in accordance with an elapsed time. The attack control unit controls the leading character so as to damage the enemy characters without using any of the weapon items until a predetermined time elapses from the generation of the enemy characters at the predetermined position.

25 Claims, 16 Drawing Sheets

OTHER PUBLICATIONS

"Clinical Trials of Rex Ronan", pp 1–2, copyright 1998 Click Health, Inc. [online], <http://www.clickhealth.com/clinsmok.htm>.*

A magizine "Mycom Basic Magazine", 8–7–85, Published on Jul. 1, 1989 by Denpashinbunsha, p1.*

A magizine "Mycom Basic Magazine", 8–10–88, Published on Oct. 1, 1989 by Denpashinbunsha.*

A magizine "Mycom Basic Magazine", 10–4–106, Published on Oct. 1, 1989, Japan by Denpashinbunsha, 241.*

A magazine "Mycom Basic Magazine", 10–4–106, Published on Apr. 1, 1991, by Denpashinbunsha.*

Double Dragon, 1987, Taito, pp. 1–9.*

"Mycom Basic Magazine", 8–7–85, published on Jul. 1, 1989 by Denpashinbunsha, P102, P286 description portions of "Stage 2" and P290 description portions "Round 3 Kurage–don".

"Mycom Basic Magazine", 8–10–88, published on Oct. 1, 1989 by Denpashinbunsha, P181, Photograph 3 and description portion concerning "the number of fires increases after the elapse of a time".

"Mycom Basic Magazine", 8–10–88, published on Oct. 1, 1989 by Denpashinbunsha, P181, Photograph 3 and description thereof, i.e., "the number of fires increases after the elapse of a time".

"Mycom Basic Magazine", 10–4–106, published on Apr. 1, 1991 by Denpashinbunsha, P271, reciting "we grow greatly unless prompt performance is conducted".

"Mycom Basic Magazine", 10–4–106, published on Apr. 1, 1991 by Denpashinbunsha, P273, reciting "it is not too late to carry our detoxification after all is eliminated".

* cited by examiner

FIG. 3

| | MONDAY | TUESDAY | WEDNESDAY | THURSDAY | FRIDAY | SATURDAY | SUNDAY |
|---|---|---|---|---|---|---|---|
| MORNING | BREAKFAST | | | | | | FREE |
| | INSTILLATION | MEDICAL EXAMINATION | EXAMINATION RESULTS | INSTILLATION | MEDICAL EXAMINATION | INSTILLATION | |
| | LUNCH | | | | | | |
| AFTERNOON | HOBBY | TREATMENT | INSTILLATION | TREATMENT | HOBBY | TREATMENT | |
| | DINNER | | | | | | |
| NIGHT | HOBBY | | | | | | |
| | SLEEP | | | | | | |

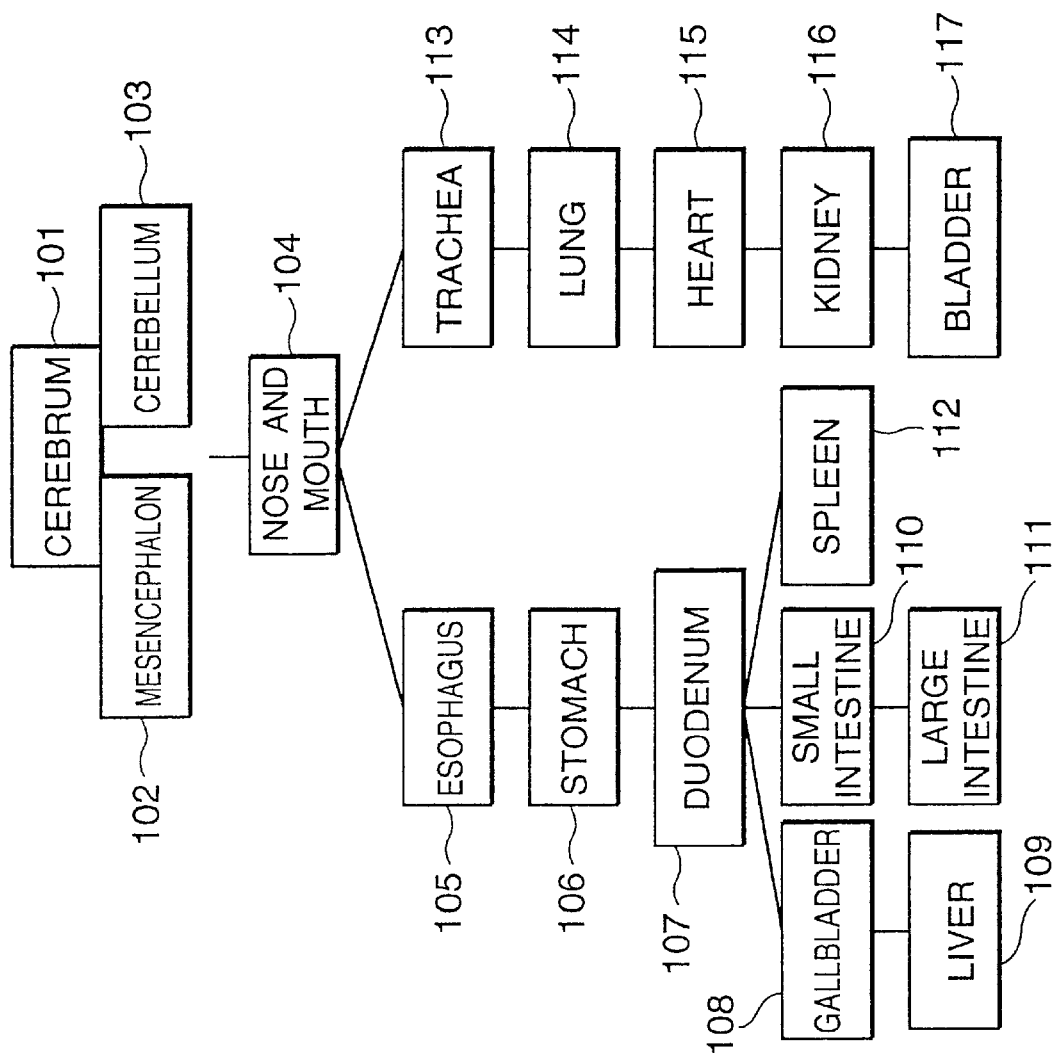
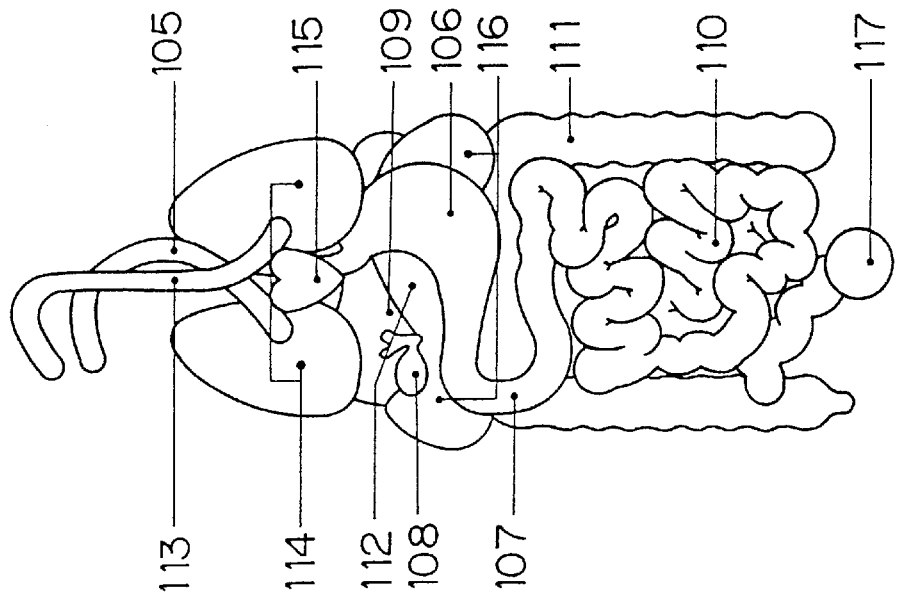
FIG. 5A
FIG. 5B

FIG. 9
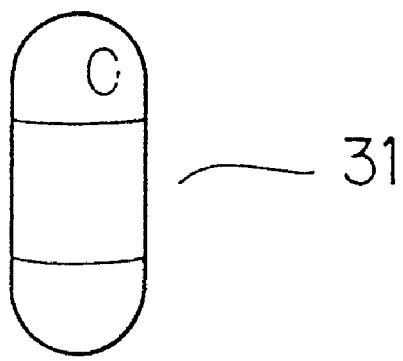
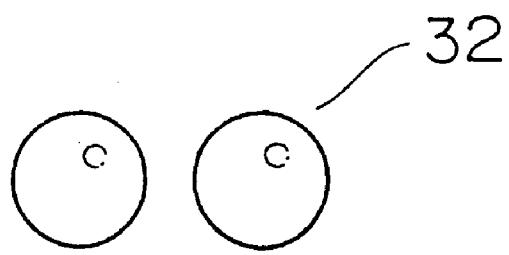
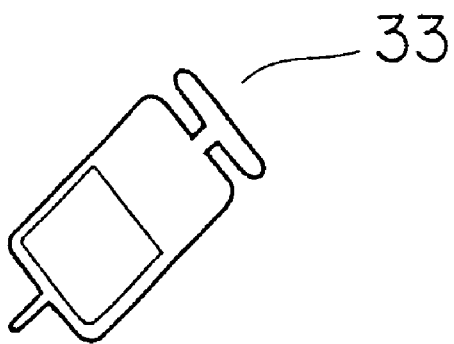

FIG. 13

| NAME OF DISEASE | CAUSES | INTERNAL AFFECTIONS | EFFECTIVE NUTRIENTS |
|---|---|---|---|
| GASTRIC ULCER | INCIDENT DUE TO SMOKING OR STRESS | DISEASE GERMS HURT STOMACH WALLS | VITAMINS B, U, A, E, AND C, CALCIUM, LINOLEIC ACID, ETC. |
| ESOPHAGITIS | EXCESS IN DRINKING AND EATING, ALCOHOL, AND STRESS | GASTRIC ACID FLOWS BACK. | VITAMINS B, U, A, E, AND C, DIETARY FIBER, ETC. |
| HEPATOCIRRHOSIS | VIRUS, ALCOHOL | LIVER HARDENS AND CANNOT SYNTHESIZE AND STORE NUTRIENTS. | GLUTATHIONE, GLYCYRRHIZINIC ACID, BIFIDUS BACTERIA, AND VITAMINS AND MINERALS, ETC. |
| PNEUMONIA | INFLAMMATION DUE TO INFECTION OF VIRUS AND GERMS | COUGH DISABLES LEADING CHARACTER FROM MOVING. | LECTIN, LACTOFERRIN, CYSTEIN, $\beta$-CAROTENE |
| VOLVULUS | | LEADING CHARACTER IS BLOCKED DUE TO TWIST OF INTESTINE. | |
| ARTERIOSCLEROSIS | HYPERPIESIA, CORPULENCE, LACK OF EXERCISE, AND STRESS | ARTERIES HARDENS TO BLOCK LEADING CHARACTER. | CASEIN, METHIONINE, VITAMINS B, C, AND E, AND LINOLEIC ACID |

VIDEO GAME MACHINE, VIDEO-GAME DISPLAY CONTROL METHOD, AND COMPUTER-READABLE RECORDING MEDIUM CONTAINING VIDEO GAME PROGRAM

BACKGROUND OF THE INVENTION

1. Field of the Invention

The present invention relates to video game machines using a recording medium such as an optical disk, a magnetic disk, or a semiconductor memory on which program data are recorded, methods for controlling video game display, and computer-readable recording media containing video game programs.

2. Description of the Related Art

Many game systems have been proposed, such as a system comprised of a home-use game console and a television monitor, a commercial-use game machine, and a system comprised of a personal computer or work station, a display, and a sound output device.

The game systems each include a player-operated controller, a recording medium containing game-program data, a central processing unit (CPU) for performing control for the generation of sound and images based on the game-program data, a processor for generating images, a processor for generating sound, a monitor for displaying images, and a speaker for outputting the generated sound. In many cases, the types of recording medium include a compact-disk readonly memory (CD-ROM), a semiconductor memory, and a cassette having a built-in semiconductor memory.

In conventional video games in which a leading character fights against an enemy character, in general, a game player operates a controller, whereby the leading character is manipulated to use a weapon item for fighting against the enemy character so that the enemy character is damaged.

SUMMARY OF THE INVENTION

Accordingly, it is an object of the present invention to provide a video game machine in which, in a video game of fighting between a leading character and enemy characters, the leading character is allowed to damage the enemy characters without using weapon items from the generation of the enemy characters until a predetermined time elapses, whereby the video game is diversified, and to provide a video-game display control method for the video game machine and a computer-readable recording medium containing a program of the video game.

To this end, according to an aspect of the present invention, the foregoing object is achieved through provision of a video game machine including a display unit for displaying a game screen based on a video game in which a leading character fights to attack enemy characters, a display control unit for displaying the leading character and enemy characters on the game screen, an operation unit for outputting operation signals in accordance with external operations, an attack control unit for controlling the leading character on the game screen so that the leading character uses weapon items in accordance with the operation signals to attack the enemy characters, and an enemycharacter generating unit for newly generating the enemy characters at a predetermined position in accordance with an elapsed time. The attack control unit controls the leading character so as to damage the enemy characters without using any of the weapon items until a predetermined time elapses from the generation of the enemy characters at the predetermined position.

According to another aspect of the present invention, the foregoing object is achieved through provision of a video-game-display control method including the step of displaying, on a display unit, a game screen in which a leading character fights using weapon items to damage enemy characters. The enemy characters are newly generated at a predetermined position in accordance with an elapsed time, and, until a predetermined time elapses from the generation of the enemy characters at the predetermined position, the leading character is allowed to damage the enemy characters without using any of the weapon items.

According to a further aspect of the present invention, the foregoing object is achieved through provision of a computer-readable recording medium containing a video game program for displaying, on a display unit, a game screen in which a leading character fights using weapon items to damage enemy characters. The program includes an enemy-character generating step for newly generating the enemy characters at a predetermined position in accordance with an elapsed time, and an attack setting step for allowing the leading character to damage the enemy characters without any of the weapon items until a predetermined time elapses from the generation of the enemy characters at the predetermined position.

According to the present invention, each enemy character is generated at new predetermined positions, and a leading character can fight to damage the enemy character without using weapon items until a predetermined time elapses from the generation of the enemy character. Accordingly, the leading character can quickly defeat the enemy characters, even when the leading character fights against a plurality of enemy characters. This diversifies the video game. In addition, the leading character can easily defeat the enemy characters without the weapon items until the predetermined time elapses. Accordingly, the game player can manipulate the leading character to defeat the enemy characters within the predetermined time, which makes the video game suspensive and enjoyable.

BRIEF DESCRIPTION OF THE DRAWINGS

FIG. 3 is a table showing a schedule for a patient character.

FIGS. 5A and 5B are drawings showing fields as an area in which a leading character moves.

FIG. 9 is a drawing showing weapon items used by a leading character in a fight against an enemy character.

FIG. 13 is a table showing examples of names of diseases used in a video game, causes of the diseases, and internal effects and effective nutrients.

DESCRIPTION OF THE PREFERRED EMBODIMENTS

Figure 16:
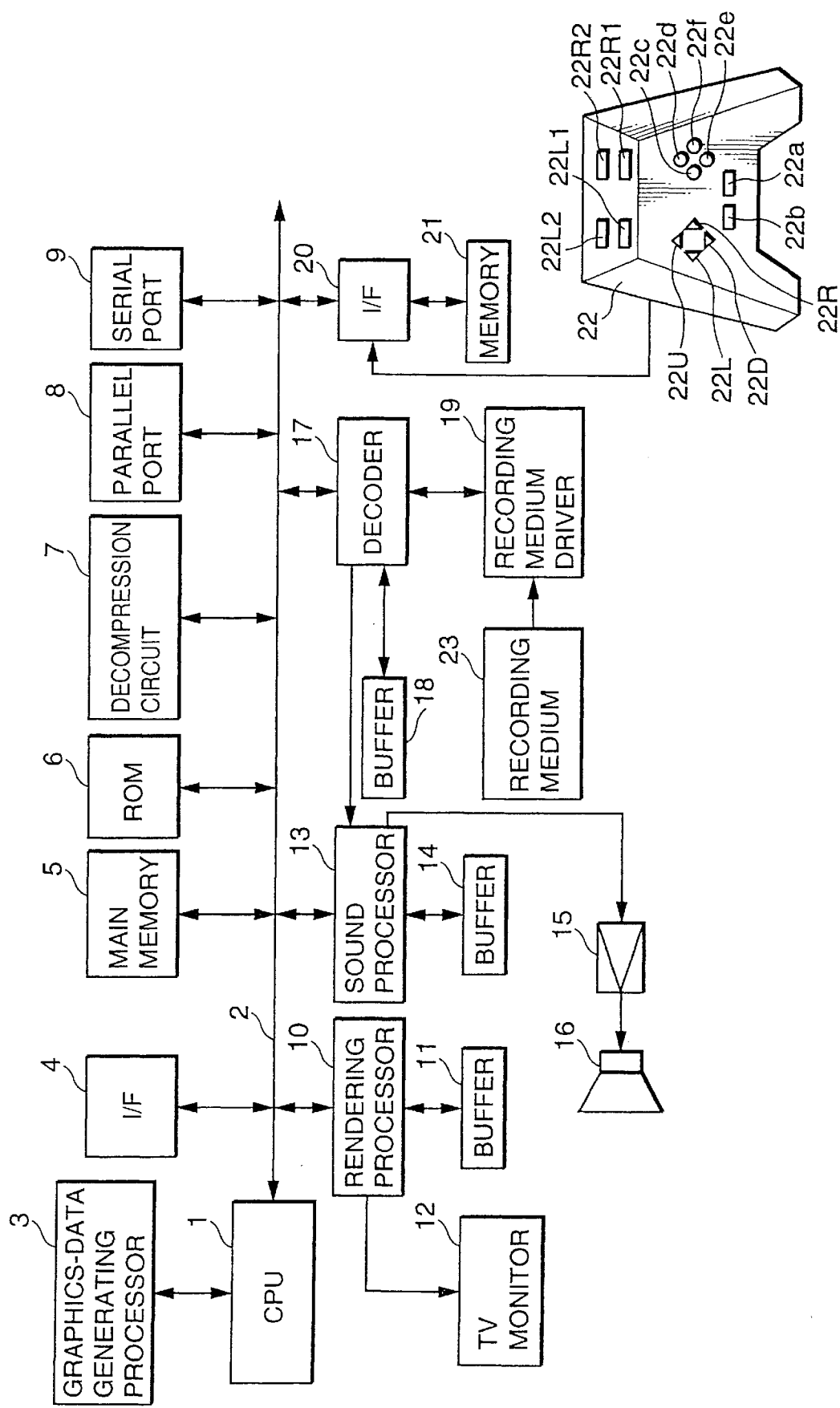
FIG. 16 is a block diagram showing a video game system according to an embodiment of the present invention.

FIG. 16 shows a game system according to an embodiment of the present invention.

This game system includes a game machine and a recording medium 23 containing program data. The game machine includes a central processing unit (CPU) 1, a bus 2 (connected to the CPU 1) including an address bus, a data bus, and a control bus, and various functional units connected to the bus 2.

A graphics-data generating processor 3, an interface circuit 4, a main memory 5, a read-only memory (ROM) 6, a decompression circuit 7, a parallel port 8, a serial port 9, a rendering processor 10 and a buffer 11 therefor, a sound processor 13 and a buffer 14 therefor, a decoder 17 and a buffer 18 therefor, and an interface circuit 20 and a memory 21 therefor, are connected to the bus 2.

A television monitor (hereinafter referred to simply as a "monitor") 12 is connected to the rendering processor 10. A speaker 16 is connected to the sound processor 13 via an amplifier circuit 15. A recording medium driver 19 is connected to the decoder 17. The memory 21 and a controller 22 are connected to the interface circuit 20.

The form of the game system differs depending on its purpose. In other words, in the case where the game system is intended for home use, the monitor 12 and the speaker 16 are provided separately from the main machine.

In the case where the game system is intended for commercial use, all the functional units shown in FIG. 16 are integrated in a casing.

The game system has a computer or workstation as a core, the monitor 12 corresponds to a display for a computer, and the rendering processor 10, the sound processor 13, and the decompression circuit 7 correspond to part of the program data recorded in the recording medium 23, or to the hardware of an add-in board in an add-in slot of the computer. In addition, the interface circuit 4, the parallel port 8, the serial port 9, the interface circuit 20 correspond to the hardware of an add-in board in an add-in slot of the computer, and the buffers 11, 14, and 18 correspond to the main memory 5 or areas of an extension memory.

This embodiment shows the case where the game system is intended for home use.

First, the functional units shown in FIG. 16 are described below.

The graphics-data generating processor 3 functions as a so-called "co-processor" for the CPU 1. In other words, the graphics-data generating processor 3 uses parallel processing to perform, for example, coordinate transformation, illumination computation, and computation using fixed-point matrices and vectors. Main processing by the graphics-data generating processor 3 includes a process in which, based on coordinate data, translation data, and rotation data of each vertex in a two-dimensional or three-dimensional plane of image data supplied from the CPU 1, an address in a display area for an image to be processed is computed and sent to the CPU 1, and a process in which an image brightness is computed in accordance with a distance from a virtual light source.

The interface circuit 4 is an interface with peripheral devices, for example, pointing devices such as a mouse and a trackball. In the ROM 6, program data as the operating system of the game system are stored. This corresponds to a basic input output system (BIOS) in a personal computer.

The decompression circuit 7 decompresses a compressed image obtained by intra-encoding based on the Moving Picture Experts Group (MPEG) standard for a moving picture or the Joint Photographic Experts Group (JPEG) standard for a still image. Decompression includes decoding (the decoding of data encoded using variable length codes), inverse quantization, inverse discrete cosine transform (IDCT), and intra image restoration.

The rendering processor 10 performs rendering in the buffer 11, based on a rendering command issued by the CPU 1.

The buffer 11 consists of a display area and a non-display area. The display area is an area into which data to be displayed on the screen of the monitor 12 is loaded.

In this embodiment, the non-display area is a storage area for storing data defining skeletons, model data defining polygons, animation data for causing models to move, pattern data representing animations, texture data, and color-palette data, etc.

The texture data are two-dimensional image data. The color-palette data specify the colors of the texture data or the like. The texture data and the color-palette data are prestored in the non-display area of the buffer 11.

Rendering commands include a rendering command for using polygons to render a three-dimensional image, and a rendering command for rendering an ordinary two-dimensional image. The polygons are two-dimensional polygonal virtual images. In this embodiment, triangles or quadrangles are used as the polygons.

Each rendering command that uses polygons to render a three-dimensional image consists of polygon-vertex-address data in the display area of the buffer 11, texture-address data representing the storage position of the texture data to be pasted on a polygon in the buffer 11, color-palette-address data representing a position in the buffer 11 at which the color-palette data representing the color of a texture is stored, and brightness data representing the brightness of the texture.

Among these data, the polygon-vertex-address data in the display area of the buffer 11 is obtained such that the graphics-data generating processor 3 replaces three-dimensional polygon-vertex coordinate data from the CPU 1 with polygon-vertex coordinate data by performing coordinate transformation based on translation data of the screen (viewpoint) and rotation data. The brightness data is determined by the graphics-data generating processor 3, based on the distance between a position represented by polygon-vertex coordinate data obtained after the coordinate transformation and the virtual light source.

The polygon-vertex address data represents an address in the display area of the buffer 11. The rendering processor 10 stores, in ranges (in the display area of the buffer 11) represented by triangular or quadrangular polygon vertex address data, texture data corresponding to the ranges.

One object consists of a plurality of polygons. The CPU 1 stores, in the buffer 11, the three-dimensional coordinate data of each polygon so that they are correlated with the vector data of skeleton data corresponding to the polygon. In the case where the game character is moved by operating the controller 22, in other words, in the case where an action of the game character is expressed, or the viewpoint position for viewing the game character is shifted, the following processes are performed.

The CPU 1 supplies, to the graphics-data generating processor 3, the three-dimensional coordinate data of the vertices of polygons which are held in the non-display area of the buffer 11, and the translation data and rotation data of polygons which are obtained based on skeleton coordinates and the rotation data thereof.

Based on the three-dimensional coordinate data of the vertices of each polygon, and the translation and rotation data of each polygon, the graphics-data generating processor 3 sequentially computes the three-dimensional coordinate data of each polygon that is translated and rotated.

Among the obtained three-dimensional coordinate data, horizontal and vertical coordinate data are supplied as address data, that is, polygon-vertex address data, in the display area of the buffer 11, to the rendering processor 10.

The rendering processor 10 stores, in a triangular or quadrangular display area of the buffer 11 represented by triangular or quadrangular polygon vertex address data, texture data represented by pre-assigned texture address data, whereby an object formed by pasting texture data on a plurality of polygons is displayed on the screen of the monitor 12.

Each rendering command consists of vertex-address data, texture-address data, color-palette-address data representing the storage position of color-palette data representing the color of texture data in the buffer 11, and brightness data representing the brightness of the texture. Among these data, the vertex-address data is coordinate data obtained by performing, based on the translation and rotation data from the CPU 1, coordinate transformation of vertex coordinate data in a two-dimensional space.

The sound processor 13 stores, in the buffer 14, adaptive differential-pulse-code-modulated (ADPCM) data read from the recording medium 23, and uses the stored ADPCM data as a sound source. The sound processor 13 reads the ADPCM data at, for example, a clock rate having a frequency of 44.1 kHz.

The sound processor 13 processes the ADPCM data read from the buffer 14 so that pitch conversion, noise addition, envelope setting, level setting, and reverb addition are performed.

In the case where sound data read from the recording medium 23 is pulse-code-modulated (PCM) data for a CD-DA (compact disk digital audio), the sound processor 13 converts the sound data into ADPCM data.

The processing of the PCM data by the program data is directly performed in the main memory 5. The PCM data processed in the main memory 5 is supplied and converted into ADPCM data in the sound processor 13. The ADPCM data is processed as described above, and the processed data is output from the speaker 16.

The recording medium driver 19 is, for example, a CDROM drive, a hard disk drive, an optical disk drive, a flexible disk drive, a silicon disk drive, or a cassette medium reader.

The recording medium 23 is, for example, a CD-ROM, an optical disk, a flexible disk, or a semiconductor memory.

The recording medium driver 19 reads and supplies images, sound, and program data from the recording medium 23 to the decoder 17. The decoder 17 performs error correction using error correction codes for the reproduced data from the recording medium driver 19, and supplies the error-corrected data to the main memory 5 or the sound processor 13.

The memory 21 consists of, for example, a card type memory, and stores various game parameters such as the storing of termination conditions.

The controller 22 includes, as externally operable operation units, a first left button 22L1, a second left button 22L2, a first right button 22R1, a second right button 22R2, an up-key 22U, a down-key 22D, a left key 22L, a right key 22R, a start button 22a, a select-button 22b, a first button 22c, a second button 22d, a third button 22e, and a fourth button 22f. The controller 22 is operated by the game player, and outputs operation signals in accordance with types of operation by the game player.

The up-key 22U, the down-key 22D, the left key 22L, and the right key 22R are used when the game player gives, to the CPU 1, commands for vertically and horizontally moving the game character, and commands for moving a selected icon on the menu screen of the game.

The start button 22a is used when the game player instructs the CPU 1 to initiate execution of the game program data loaded from the recording medium 23. The select-button 22b is used when the game player notifies the CPU 1 of various selections as to the game program data loaded into the main memory 5.

The functions of the first button 22c, the second button 22d, the third button 22e, the fourth button 22f, the first left button 22L1, the second left button 22L2, the first right button 22R1, and the second right button 22R2 differ depending on the game program data loaded from the recording medium 23.

The game system is briefly described below.

When a main power switch (not shown) is turned on, the game system is supplied with power. In the case where the recording medium 23 is loaded into the recording medium driver 19, the CPU 1 instructs the recording medium driver 19 to read the program data from the recording medium 23, based on the operating system stored in the ROM 6. In accordance with the instruction, the recording medium driver 19 reads images, sound, and program data from the recording medium 23.

The read images, sound, and program data are supplied to the decoder 17, and error correction for the supplied data is performed. The error-corrected image data is supplied from the decoder 17 to the decompression circuit 7 via the bus 2, and the decompression circuit 7 performs the above-described decompression. The decompressed image data is supplied to the rendering processor 10, and the rendering processor 10 stores the supplied data in the non-display area of the buffer 11.

The error-corrected sound data is supplied from the decoder 17 to the main memory 5 or the sound processor 13, and the supplied data is stored in the main memory 5 or the buffer 14.

The error-corrected program data from the decoder 17 is supplied and stored in the main memory 5. Subsequently, based on the game program data, and the content of an instruction from the game player via the controller 22, the CPU 1 proceeds with the game. In other words, the CPU 1 appropriately controls image processing, sound processing, and internal processing, based on the content of an instruction from the game player via the controller 22.

In this embodiment, the control of image processing includes computation of the coordinates of each skeleton or computation of the vertex-coordinate data of each polygon from pattern data corresponding to an animation selected for the game character, supply of the obtained three-dimensional coordinate data or viewpoint-point data to the graphics-data generating processor 3, and issue of a rendering command including address data (in the display area of the buffer 11) or brightness data found by the graphics-data generating processor 3.

The control of sound processing includes issue of a sound output command to the sound processor 13, and selection of a level or reverb for the sound processor 13.

The control of internal processing includes, for example, an arithmetic operation in accordance with the operation of the controller 22.

Figure 1:
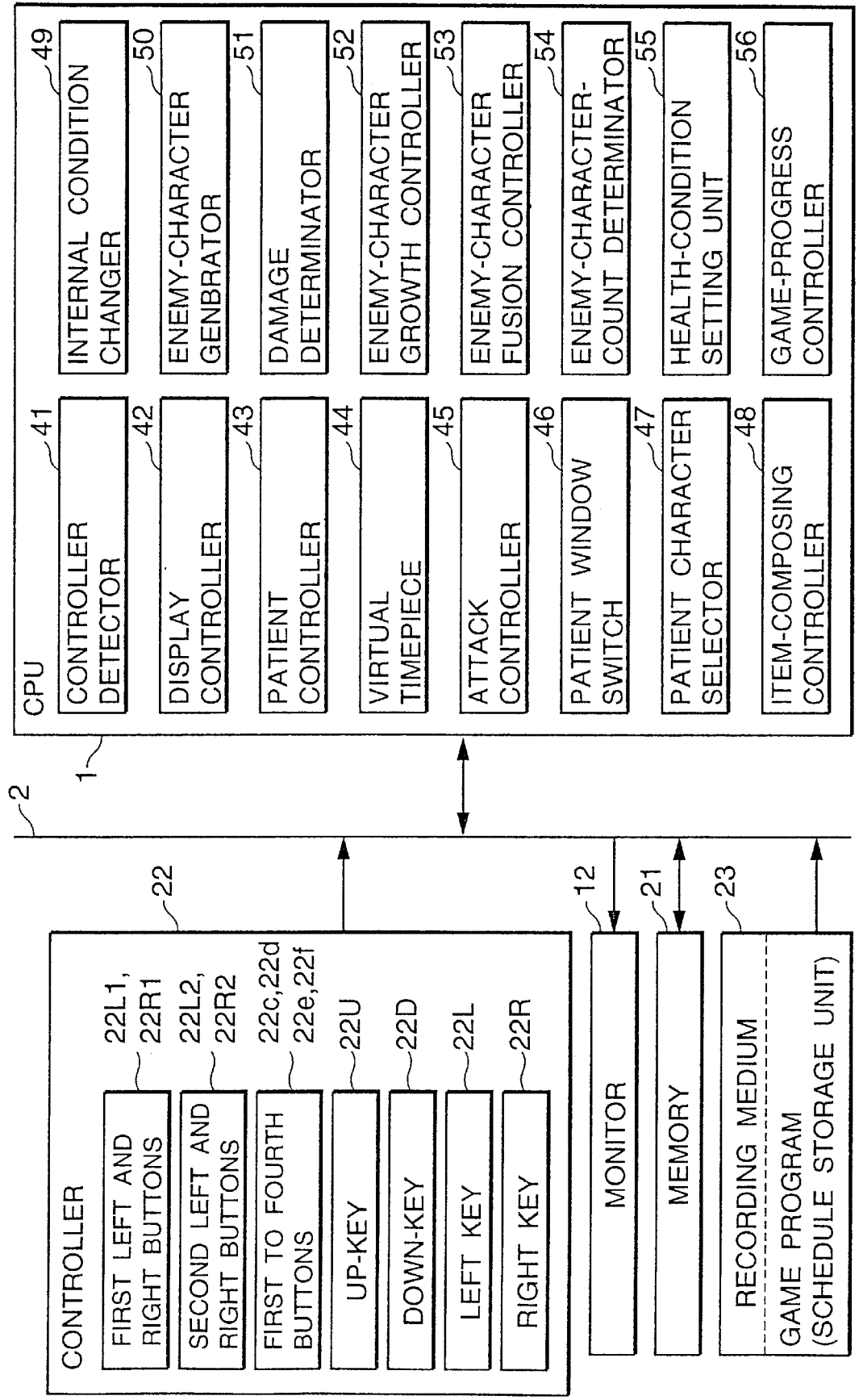
FIG. 1 is a block diagram showing the functional blocks of a central processing unit in a video game machine according to the present invention.

FIG. 1 shows the functional blocks of the CPU 1. Components between the monitor 12 and the bus 2, and components between the recording medium 23 and the bus 2, are not shown for brevity. The game content stored in the recording medium 23 is, for example, as follows:

A leading character existing in the body of a hospitalized patient character is manipulated by operating the controller 22 to fight against a plurality of enemy characters representing disease germs. The leading character damages and defeats each enemy character, and when the leading character finally defeats a boss-enemy character as the boss of the enemy characters by doing a predetermined amount of damage, the patient character is allowed to leave hospital, whereby the game ends.

In the case where the leading character fails to defeat the enemy characters, and the number of the enemy characters increases to more than a predetermined number, or the leading character's power is reduced to zero due to a predetermined amount of damage in fighting against the boss-enemy character, a surgical operation for the leading character is performed, and the game ends.

The CPU 1 includes, as functional blocks shown in FIG. 1, a controller detector 41, a display controller 42, a patient controller 43, a virtual timepiece 44, an attack controller 45, a patient-window switch 46, a patient character selector 47, an item-composing controller 48, an internal condition changer 49, an enemy-character generator 50, a damage determinator 51, an enemy-character growth controller 52, an enemy-character fusion controller 53, an enemy-character-count determinator 54, a health-condition setting unit 55, and a game-progress controller 56.

The controller detector 41 detects activation of a controller operation, based on an operation signal from each operation unit of the controller 22.

The functions of the functional blocks are described below with reference to the accompanying drawings.

Figure 2:
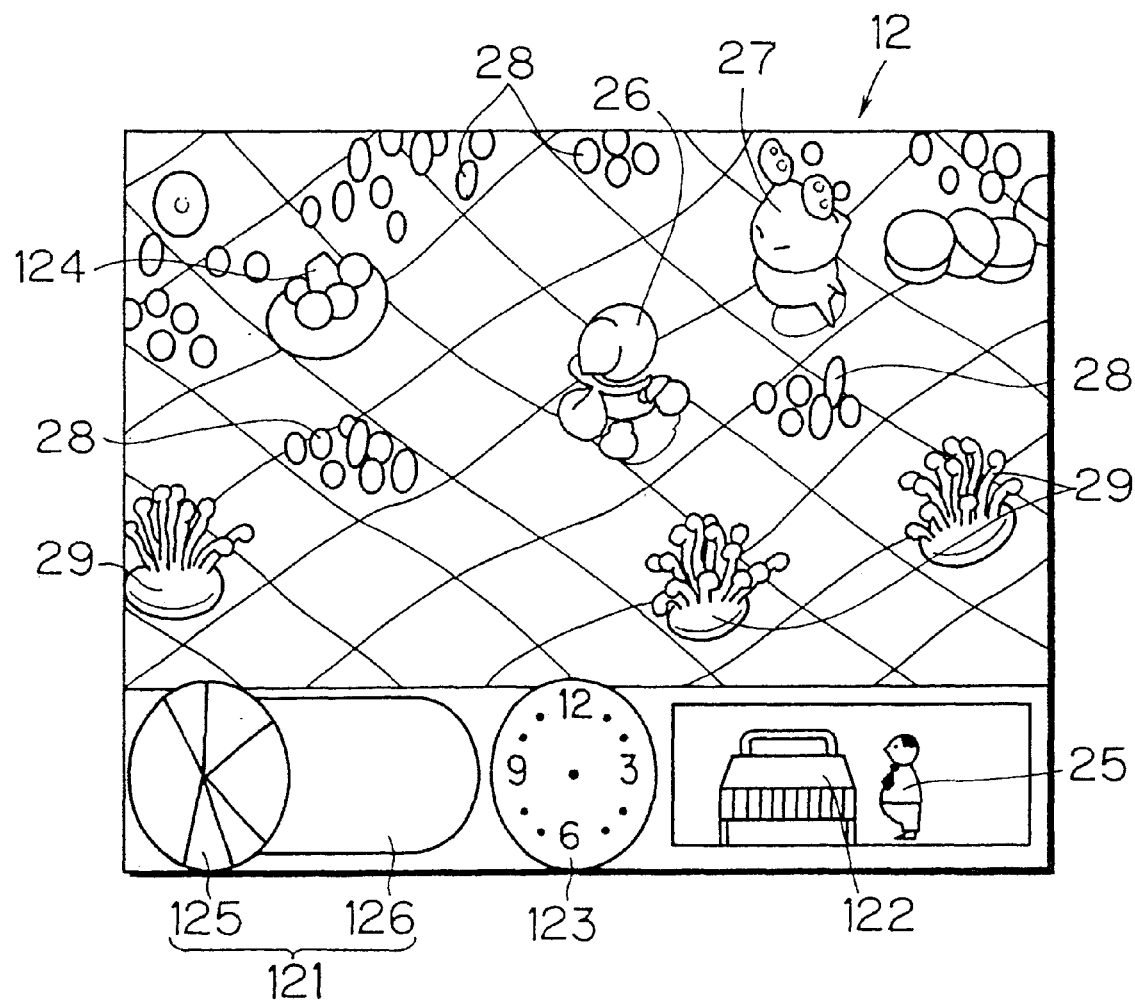
FIG. 2 is a drawing showing a displayed game screen.
Figure 4A:
FIGS. 4A to 4G are drawings showing conditions of a patient character.
Figure 4B:
Figure 4C:
Figure 4D:
Figure 4E:
Figure 4F:
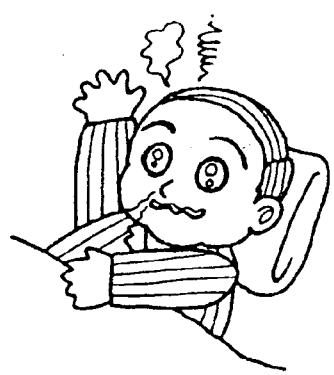
Figure 4G:

FIG. 2 shows a game screen, and FIG. 3 shows an example of the schedule of a patient character.

The screen of the monitor 12 is separated by the display controller 42 into an information display section 121 in the bottom-left part, a patient window 122 in the bottom-right part, a timepiece section 123 therebetween, and an action display section above the sections 121 to 123. The patient window 122 displays a patient character 25, and the action display section 124 displays a leading character 26.

The information display section 121 consists of a virus meter 125 and a leading-character power gauge 126. The virus meter 125 shows the number of virus images (described below) existing in an organ model (described below) at the present position of the leading character 26 and the number of virus images existing in the body of the leading character 26 by using the areas of sectors separately colored in the right and left semicircles. The leading-character power gauge 126 uses its length to indicate the remaining power of the leading character 26.

The patient window (a patient-condition screen and a patient-action screen) 122 displays the patient character 25. The patient window 122 displays, for example, a sickroom, etc., corresponding to an action of the patient character 25 controlled by the patient controller 43 (shown in FIG. 1) in accordance with the schedule (shown in FIG. 3) stored in the recording medium 23 as the schedule storage unit shown in FIG. 1. The patient character 25 is three-dimensionally displayed using a plurality of polygons.

The timepiece section 123 measures time at a predetermined rate preset by the virtual timepiece 44 (shown in FIG. 1), and shows the passing of time for the patient character 25 in hospital, whereby an action of the patient character 25 displayed in the patient window 122 is clearly shown as the type of a meal eaten by the patient character 25 is recognized as breakfast, lunch, or dinner.

The action display section 124 displays a predetermined area including the leading character 26 in the body of the patient character 25, using a two-dimensional perspective view.

When the second left button 22L2 or the second right button 22R2 (shown in FIG. 1) is operated, the display controller 42 rotates the background of the leading character 26 around the leading character 26 by a predetermined angle in the action display section 124. This switches the travelling direction of the leading character 26. Continuously pressing each button rotates the background by 360 degrees.

A field in which the leading character 26 moves is provided with, for example, squares. The leading character 26 can move square by square from the present square to any one of eight surrounding squares.

Here, with reference to FIGS. 1 and 2, transfer of the leading character 26, which is controlled by the attack controller 45, is described below.

By operating the up-key 22U, the down-key 22D, the right key 22R, or the left key 22L, the leading character 26 is advanced in FIG. 2 by one square in the corresponding direction.

By simultaneously operating the up-key 22U and left key 22L while operating the first left button 22L1 or the first right button 22R1, the leading character 26 is advanced in FIG. 2 in the upper-left diagonal direction.

By simultaneously operating the up-key 22U and the right key 22R while operating the first left button 22L1 or the first right button 22R1, the leading character 26 is advanced in FIG. 2 in the upper-right diagonal direction.

Similarly, while operating the first left button 22L or the first right button 22R1, by simultaneously operating the down-key 22D and the left key 22L, the leading character 26 is advanced in FIG. 2 in the lower-left diagonal direction, and by simultaneously pressing the down-key 22D and the right key 22R, the leading character 26 is advanced in the lower-right diagonal direction.

Although the squares are shown in FIG. 2 for convenience of description, they are actually not displayed in the action display section 124. A host character 27, a first virus image 28, and an enemy fusion character 29, displayed on the action display section 124, are described below.

With reference to FIG. 2 and FIGS. 4A to 4G, the patient character 25 displayed in the patient window 122 is described below. FIGS. 4A to 4G show the types of the condition of the patient character 25.

Game events in which the patient character 25 appears include not only the treatment and meal events shown in FIG. 3 but also various patient events such as exercise and a visit to the patient character 25 in hospital. Accordingly, the patient window (shown in FIG. 2) enables the game player to clearly understand the type of event.

The patient window 122 is set up so that when the patient character 25 is absent from the sickroom, the viewpoint can be shifted outside the sickroom by the patient-window switch 46 (shown in FIG. 1) in accordance with the operation of the controller 22.

The patient window 122 is also set up so that when a feeling scene, in which the patient character 25 feels pain due to a disease or is shocked, is displayed, the display controller 42 (shown in FIG. 1) zooms in to the face of the patient character 25 in order for the game player to understand the physical or mental condition of the leading character 26.

By way of example, FIGS. 4A, 4B, 4C, 4D, 4E, 4F, and 4G show health, pain, a headache, a cold, agony, confusion, and a heartquake, respectively.

The patient character 25 is selected from among a plurality of patient characters based on combinations of age and sex. The patient characters are provided with different types of personality. The type of accompanying disease and the rate of progress of the main disease differ depending on the personality and age of each patient character 25.

The patient character selector 47 (shown in FIG. 1) displays the plurality of patient characters on the monitor 12 before the game starts, and the game player operates the controller 22 to select any one of them as the patient character 25. This selection is performed by, for example, moving the cursor with the up-key 22U, the down-key 22D, the left key 22L, and the right key 22R, and pressing the fourth button 22f while the cursor is specifying the desired patient character.

Therefore, by selecting the desired patient character in accordance with the degree of experience of the game player, the game player can enjoy a game having a difficulty level of preference.

Figure 6:
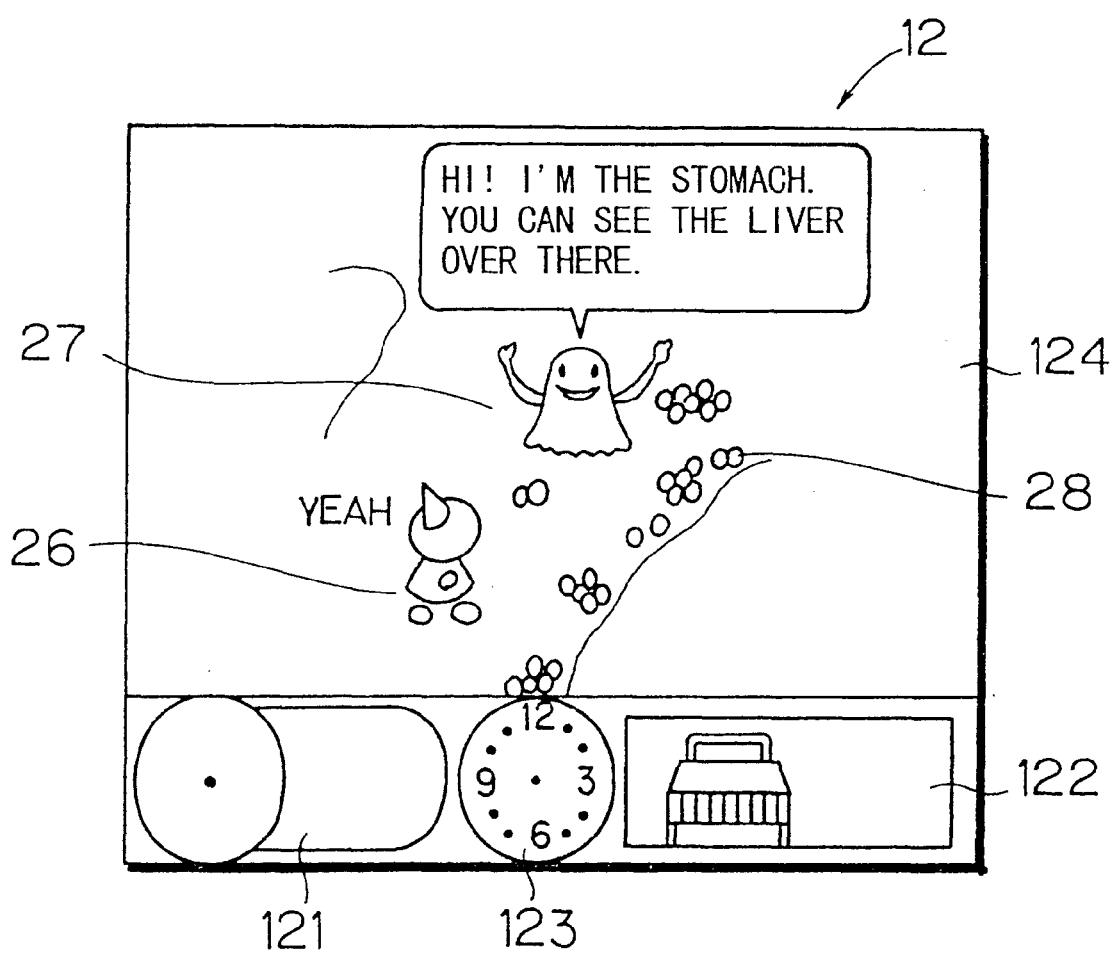
FIG. 6 is a drawing showing a game screen.
Figure 7:
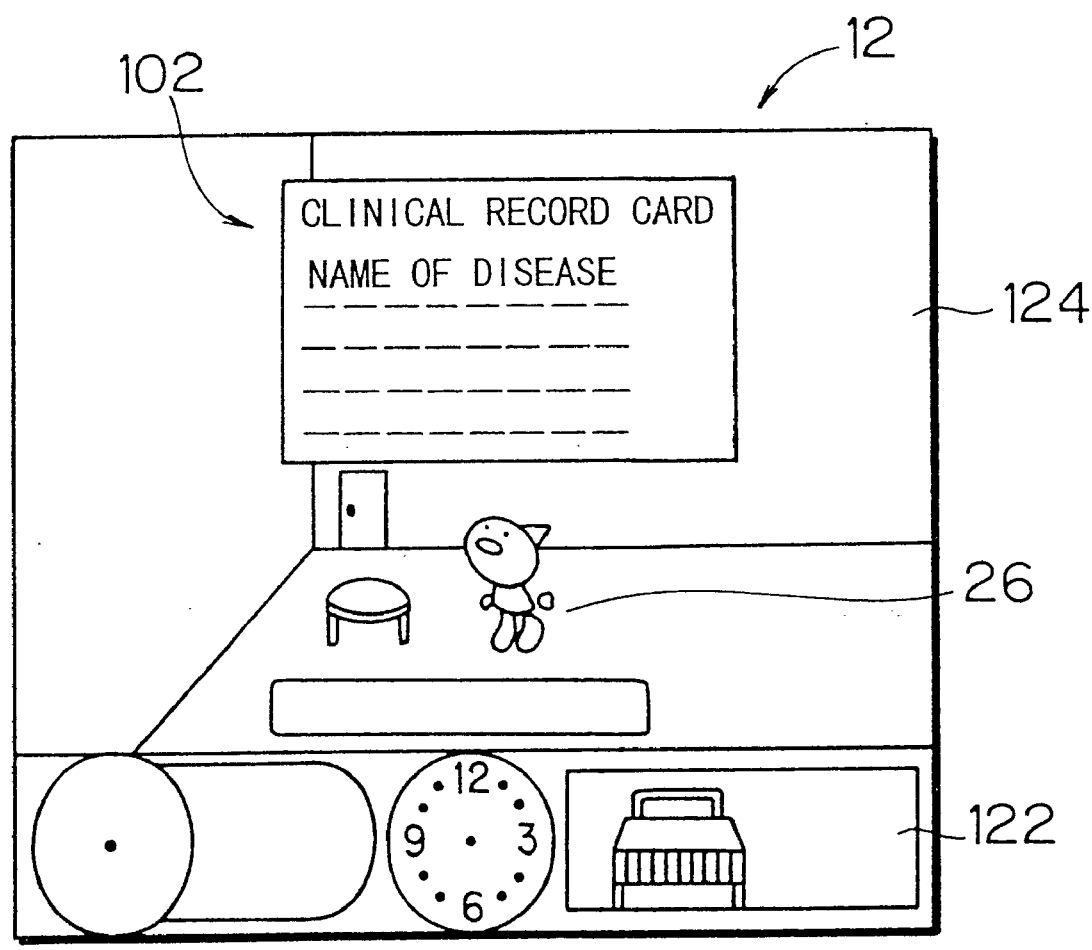
FIG. 7 is a drawing showing a game screen.
Figure 8:
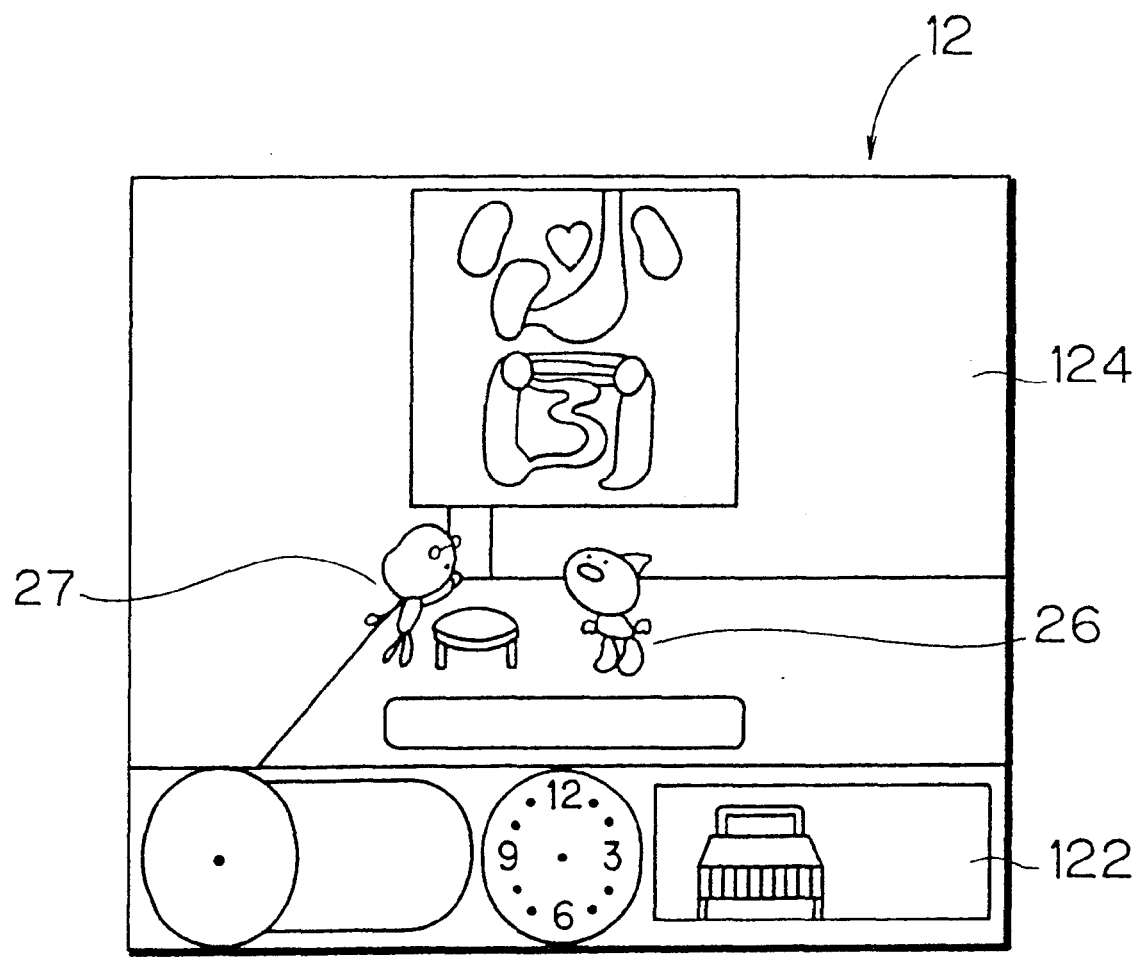
FIG. 8 is a drawing showing a game screen.

FIGS. 5A and 5B show fields that are an area in which the leading character 26 moves. FIGS. 6 to 8 show game screens.

Seventeen organ models in the body of the patient character 25 are provided as fields for the leading character 26. Specifically, as shown in FIGS. 5A and 5B, a cerebrum model 101, a mesencephalon model 102, a cerebellum model 103, a nose-and-mouth model 104, an esophagus model 105, a stomach model 106, a duodenum model 107, a gallbladder model 108, a liver model 109, a small intestine model 110, a large intestine model 111, a spleen model 112, a trachea model 113, a lung model 114, a heart model 115, a kidney model 116, and a bladder model 117, are provided.

In FIG. 5A, the cerebrum model 101, the mesencephalon model 102, the cerebellum model 103, and the nose-and-mouth model 104 are not shown for brevity.

The organ models 101 to 117 have predetermined corresponding strength levels, and they are set up so that as the level increases, the frequency of generation of virus images (described below) and the hyperplasia factor decreases, while the strength level decreases as the number of enemy characters increases. Various nutrient items (described below) are provided for the organ models 101 to 117, and the organ models 101 to 117 have different available nutrient items.

The cerebrum model 101, the mesencephalon model 102, and the cerebellum model 103 have functions of causing the patient character 25 to sleep. Since the stomach model 106 has a variety of nutrient items, it easily reflects an action of the patient character 25, and is subject to various diseases. The small intestine model 110 is like a maze, and has a plurality of weapon items. In the small intestine model 110, the weapon items are digested and absorbed to disappear.

In each of the organ models 101 to 117, there is a host character 27 as a master, as shown in FIG. 2. The leading character 26 is set so as to obtain various types of information by conversing with the host character 27 as shown in FIG. 6.

The leading character 26 uses the mesencephalon model 102 as a living room, and can know the name of the disease of the patient character 25, etc., since a clinical record card is displayed as shown in FIG. 7 when the patient character 25 is hospitalized at the start of the game. The leading character 26 returns to the mesencephalon model 102 in the middle of the game, and converses with the host character of the mesencephalon model 102, as shown in FIG. 8. This enables the leading character 26 to know affected parts of the patient character 25, that is, the organ models 101 to 117 which have a plurality of enemy characters.

Supporting characters, which have different functions, for helping the leading character 26 are provided beforehand. The leading character 26 can move together with a predetermined number of supporting characters.

Figure 10:
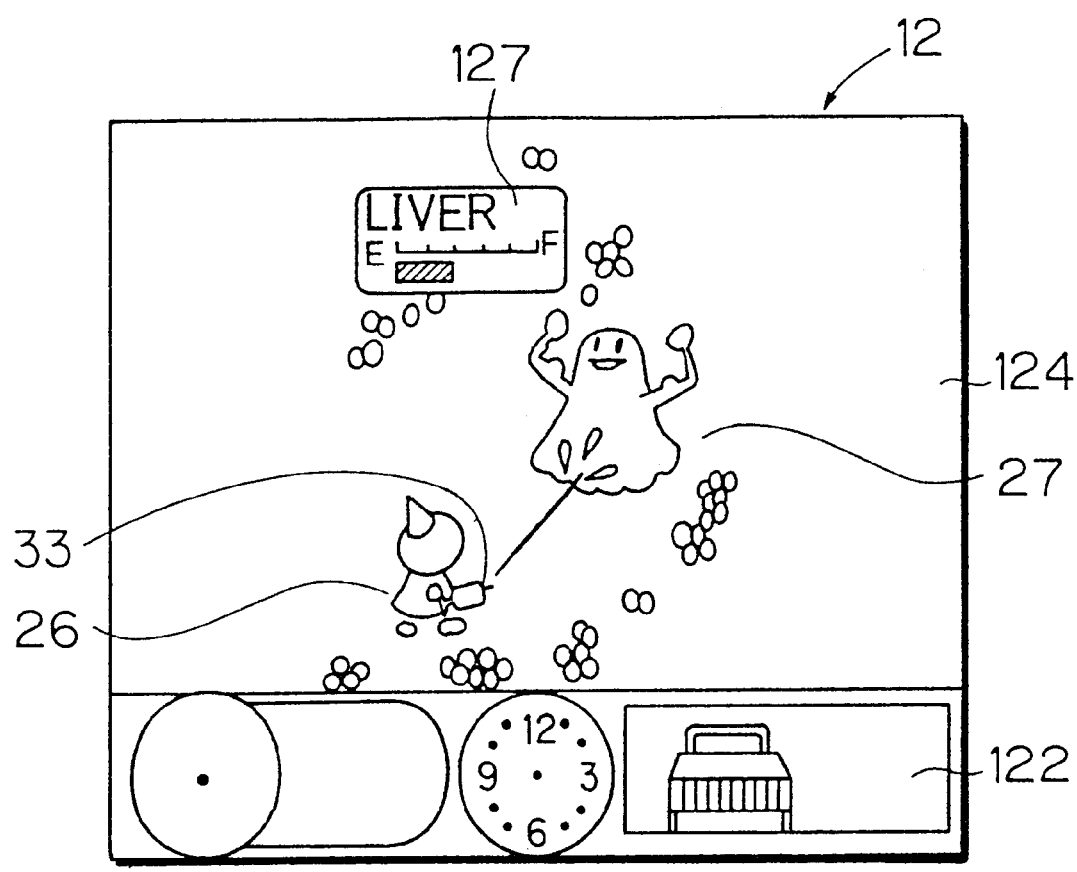
FIG. 10 is a drawing showing a game screen.

FIG. 9 shows weapon items used by the leading character 26 in fighting against the enemy characters. FIG. 10 shows a game screen.

In this game, a medicine item 31, a nutrient item 32, and an injection item 33 are provided as the weapon items, as shown in FIG. 9.

The medicine item 31 has a function of curing affected parts of the organ models 101 to 117 injured by the enemy characters, and a function of increasing the power level of the leading character 26.

The nutrient item 32 consists of nutrients such as vitamins and minerals. The nutrient item 32 damages the enemy character 26 when being used for attack. When the nutrient item 32 is put into the injection item 33, and is supplied from the injection item to the host character 27 of each of the organ models 101 to 117, its strength level increases as shown in FIG. 10. While the nutrient item 32 is being supplied to the host character 27, a strength-level display section 127 is displayed.

The obtained medicine item 31 and the nutrient item 32 are put into the injection item 33, and the injection item 33 is used to attack a remote enemy character. The needle of the injection item 33 is exchangeable. By exchanging needles, a range of attack by the injection item 33 can be changed.

The weapon items 31 to 33 are disposed at various positions in the body of the patient character 25. In the case where some types of the medicine item 31 and the nutrient item 32 are positioned in any one of the organ models 101 to 117, they are digested to disappear after a lapse of a predetermined time.

The types of the medicine item 31 and the nutrient item 32 can be used for the item-composing controller 48 (shown in FIG. 1) to compose an enhanced item in which the functions of the types of the medicine item 31 are enhanced. By operating the controller 22 in accordance with a procedure obtained by conversing with each host character 27 of the organ models 101 to 117, item composition is performed.

An example of the relationship between the patient character 25 and the leading character 26, which are provided in the game, is described below.

An action of the patient character 25 and an action of the leading character 26 are set so as to interact with each other. The interaction is displayed in the patient window 122 and the action display unit 124.

By way of example, when the patient character 25 smokes while the leading character 26 is passing through the trachea 113 and the lung 114, the internal condition changer 49 (shown in FIG. 1) causes the leading character 26 to be overcome by smoke so that the leading character 26 is disabled from acting temporarily.

It is generally known that smoking destroys vitamin C. In this game, the leading character 26 is set so as not to obtain the necessary nutrient item 32 when the patient character 25 smokes.

In the case where the leading character 26 often uses the weapon items 31 to 33 at the same position, the patient character 25 is injured in the body, and the power level of the patient character 25 and the strength level of the corresponding organ model decrease.

A case in which the patient character 25 does not eat in spite of the schedule shown in FIG. 3 is provided in this game. In this case, the patient character 25 is not supplied with the nutrient item 32, etc., and the leading character 26 is prevented from obtaining the nutrient item 32.

Figure 11:
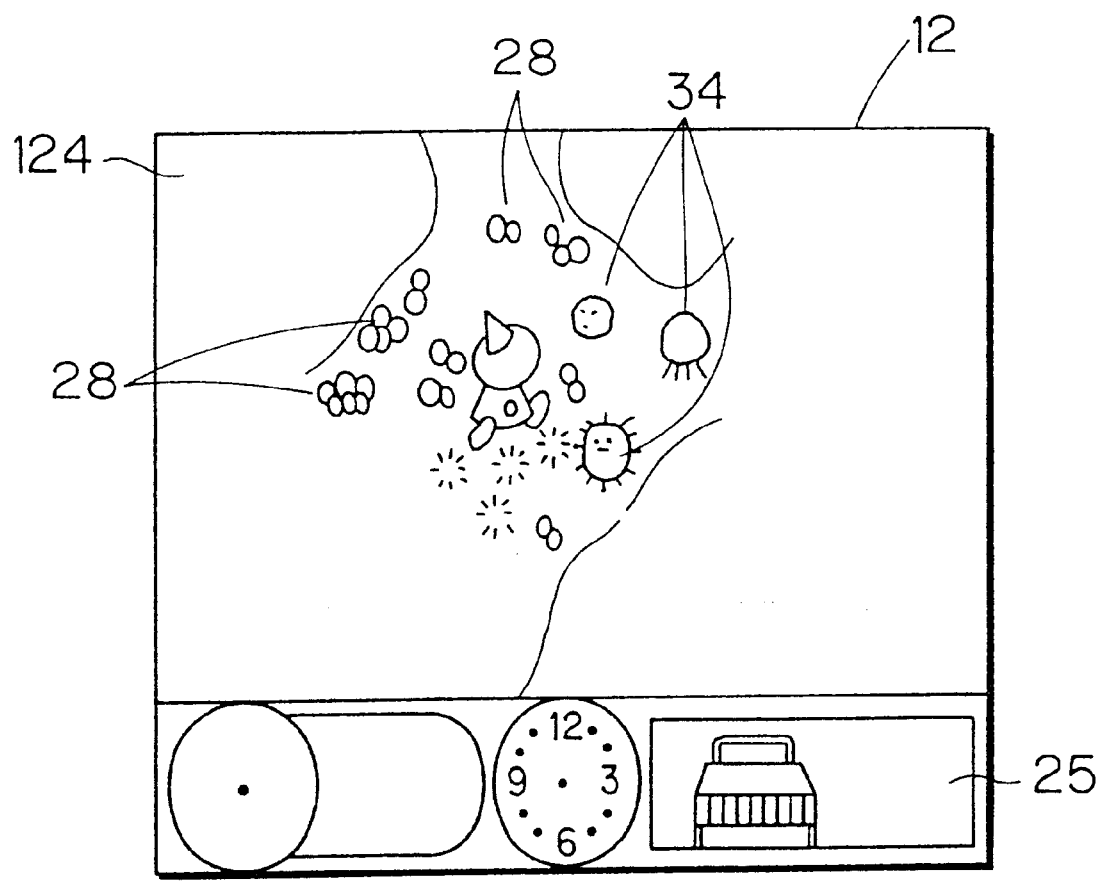
FIG. 11 is a drawing showing a game screen.
Figure 12:
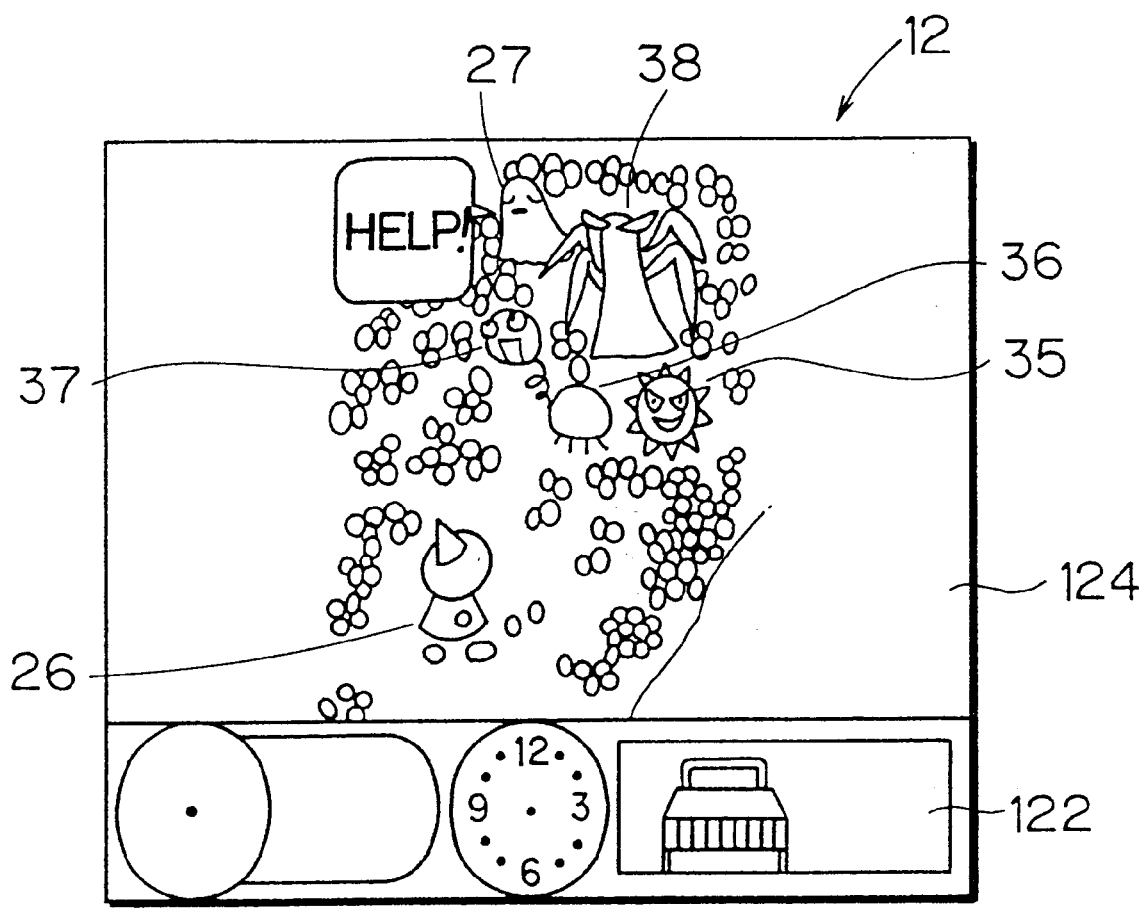
FIG. 12 is a drawing showing a game screen.

With reference to FIGS. 11 and 12 showing game screens, enemy characters are described below.

The enemy characters, which are provided in this game, include a boss-enemy character as a generator of an unknown disease, a gastric ulcer image generated by the boss-enemy character, germ images such as a polyp image and a cold image, first and second virus images 28 and 34, and a fused enemy image generated by the growth or fusion of the virus images 28 and 34.

As shown in FIG. 11, the enemy-character generator 50 (shown in FIG. 1) generates the first and second virus images 28 and 34 on the squares corresponding to predetermined positions in the body of the patient character 25 at a frequency in accordance with the strength level of each organ model. The first and second virus images 28 and 34 are set so as not to move at the beginning.

The first and second virus images 28 and 34 are set up so that when they are generated, initially, the leading character 26 only approaches them without using any weapon item (in this embodiment, for example, the leading character 26 enters the squares, and steps on them), whereby they are determined by the damage determinator 51 (shown in FIG. 1) to be defeated by a predetermined amount of damage.

When a time condition is satisfied, that is, a predetermined time elapses from the generation of the first and second virus images 28 and 34, the first and second virus images 28 and 34 are grown by the enemy-character generator 50 (shown in FIG. 1) to become the fused enemy character 29 (shown in FIG. 2) or another fused enemy character 35, 36, or 37 (shown in FIG. 12) which is not attacked by a predetermined amount of damage unless fighting and which can move.

When the enemy-character growth controller 52 (shown in FIG. 1) generates the first and second virus images 28 and 34 on predetermined squares (e.g., three adjacent squares) where fusion conditions are satisfied, the first and second virus images 28 and 34 are fused to become the fused enemy character 29 (shown in FIG. 2), or the fused enemy character 35, 36, or 37 (shown in FIG. 12) which is not attacked by a predetermined amount of damage unless fighting and which can move.

The types of the fused enemy character 29, 35, 36, or 37 have various functions. For instance, the fused enemy character 29 shown in FIG. 2 does not move and has a function of attacking the leading character 26 when the leading character 26 approaches the fused enemy character 29. The fused enemy character 35 shown in FIG. 12 has a function of using outer spines to damage the organ models 101 to 117. The fused enemy character 36 shown in FIG. 12 does not attack but has a function of absorbing the nutrient item 32. The fused enemy character 37 has a function of using irregular operations to make an attack.

The boss-enemy character or the germ image is set up so as to be defeated by the leading character 26, which is manipulated by the controller 22 to use the weapon images 31 to 33 for fighting.

The germ images are set to have various functions. For instance, the germ image 38 shown in FIG. 12 causes gastric ulcers. FIG. 12 shows that the host character 27 of the stomach model 106 is captured.

FIG. 13 shows the names of diseases used in this game, the causes of the diseases, effects to the body, and effective nutrients.

In this game, general diseases are employed, and nutrients effective to actual diseases are used as nutrient items, as shown in FIG. 13. Accordingly, the game player learns nutrients effective to each disease by playing this game.

The symptom of each disease is caused by an enemy character generated by the growth or change of the germ image or the virus image, and is displayed in the patient window 122 (shown in FIG. 2) on the monitor 12. Each disease is cured by defeating the germ image.

The generation of each disease reduces the strength of the organ models 101 to 117 (shown in FIG. 5), and the virus images are likely to be generated. The body of the patient character 25 is variously affected depending on the type of disease, and also the leading character 26 (shown in FIG. 2) is affected such as inability to move, as shown in FIG. 13.

This game employs not only the diseases shown in FIG. 13, but also stomatitis, apoplexy, gastritis, duodenal ulcer, colitis, fatty liver, acute hepatitis, cholelithiasis, cholecystitis, diabetes, nephritis, nephrotic syndrome, hyperacidity, cecitis, colon polyps, adenoiditis, bronchitis, peritonitis, etc.

Referring back to FIG. 1, the functions of the CPU 1 are further described below.

By operating the fourth button 22f, the attack controller 45 controls the leading character 26 (shown in FIG. 2) to attack enemy characters. By simultaneously operating the fourth button 22f, and the first left button 22L1 or the first right button 22R1, the weapon items 31 to 33 can be used.

The damage determinator 51 determines an amount of damage from the enemy character to the leading character 26, or from the leading character 26 to the enemy character, in a fight between the leading character 26 and the enemy character. When the amount of damage reaches a predetermined value, the damage determinator 51 determines that the leading character 26 or the enemy character is defeated.

By only detecting that the leading character 26 enters the squares where the virus image is generated, without the weapon items 31 to 33 as described above, the damage determinator 51 determines that the virus character is attacked by a predetermined amount of damage, until the virus image grows or changes.

Based on the number of enemy characters generated by the enemy-character generator 50, and the number of enemy characters determined by the damage determinator 51 to be defeated, the enemy-character-count determinator 54 determines the number of enemy characters left in the body of the patient character 25.

Based on determination by the enemy-character-count determinator 54, the health-condition setting unit 55 sets the power level of the patient character 25. The power level increases as the number of defeated enemy characters increases, and decreases as the number of remaining enemy characters increases.

Based on the game contents recorded on the recording medium 23, and the operation of the controller 22 which is detected by the controller detector 41, the game-progress controller 56 advances this game. For instance, the game player operates the start button 22a of the controller 22, whereby this game is initiated. By operating the first button 22c, the leading character 26 (shown in FIG. 2) converse with the host characters of the organ models 101 to 117 (shown in FIG. 5) or game-element images supporting the leading character 26.

The game-progress controller 56 also sets examination results (for the patient character 25 in the schedule shown in FIG. 3) so as to reflect the power level set by the health-condition setting unit 55. In the case where the power level is low, that is, bad examination results are obtained, the strength of the organ models 101 to 117 (shown in FIG. 5) decreases, which causes adverse effects. For instance, the leading character 26 (shown in FIG. 2) cannot act, a frequency of the generation of virus images increases, and a new disease is likely to be generated.

If the damage determinator 51 has determined defeat of the boss-enemy character, the game-progress controller 56 determines that treatment for the patient character 25 is completed, whereby the patient character 25 leaves hospital, and the game ends. If the damage determinator 51 has determined defeat of the leading character 26 by the boss-enemy character, the game-progress controller 56 determines that treatment for the patient character 25 has failed and an operation for the patient character 25 is scheduled.

Figure 14:
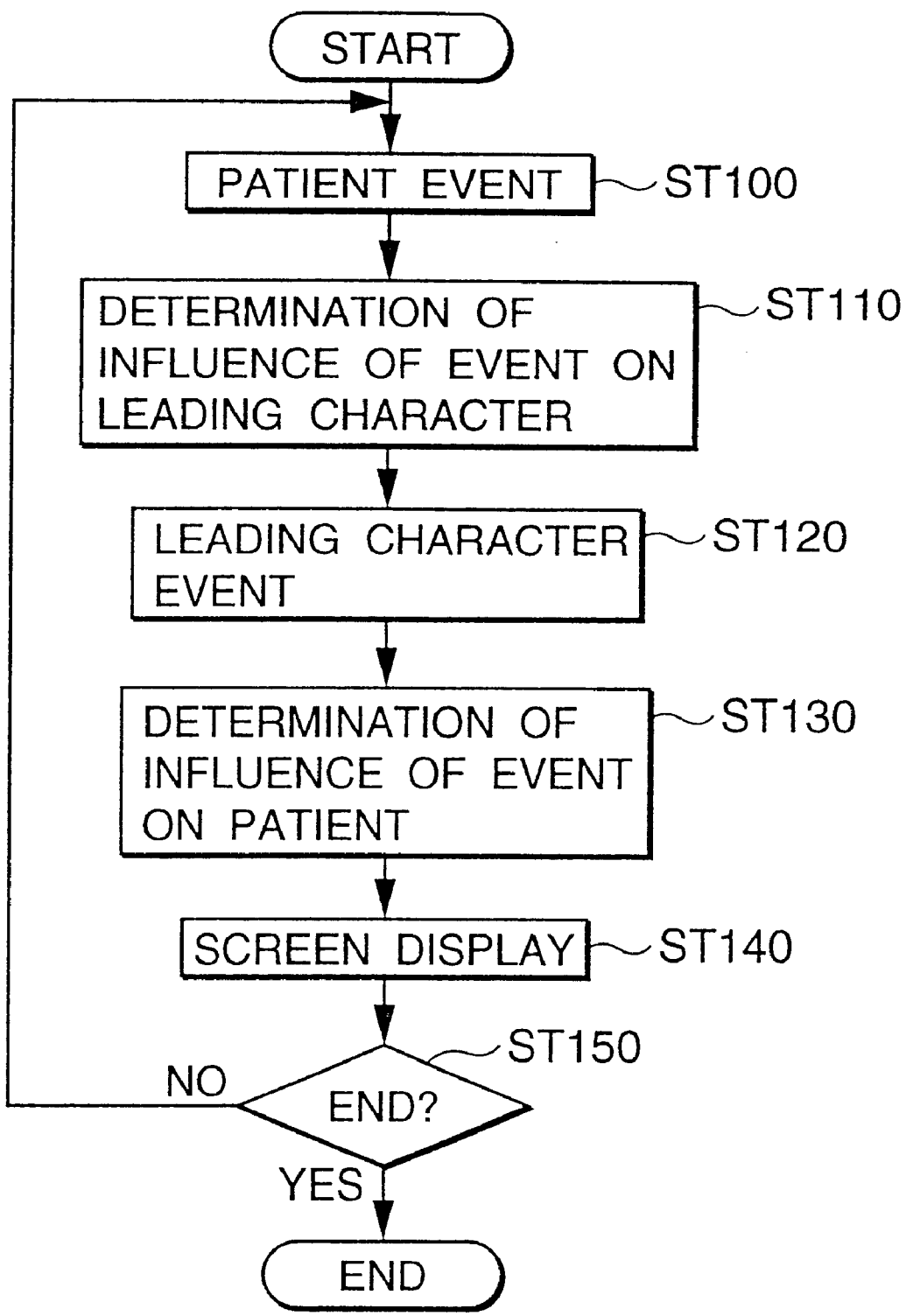
FIG. 14 is a flowchart showing a game process.

With reference to the flowchart shown in FIG. 14, a process for this game is described below.

In step ST100, a predetermined patient event such as a meal, smoking, or cancellation of eating, is performed. In step ST110, the process determines how the event influences the leading character 26.

In step ST120, a leading character event such as conversation between the leading character 26 and the host character of each organ model, acquisition of the weapon items 31 to 33, or a fight between the leading character 26 and an enemy character, is performed. In step ST130, the process determines how the leading character event influences the patient character 25.

In step ST140, a game screen is displayed on the monitor 12. At this time, the action display section 124 is displayed in accordance with the influence of an action of the patient character 25 in the patient character event on the leading character 26, and the expression of the patient character 25 displayed in the patient window 122 is controlled in accordance with the number of enemy characters in the leading character event.

In step ST150, the process determines whether the leading character 26 has been defeated or the boss-enemy character has been defeated. If either condition is satisfied ("YES" in step ST150), the game ends. If neither of both conditions is satisfied ("NO" in step ST150), the process returns to step ST100, and the above-described steps are repeatedly performed.

The game process is not limited to the above-described one, but various processes may be employed, for example, a process in which an order of the above-described steps is changed.

With reference to the flowchart shown in FIG. 15, a process for the growth and change of a virus image is described below.

Figure 15:
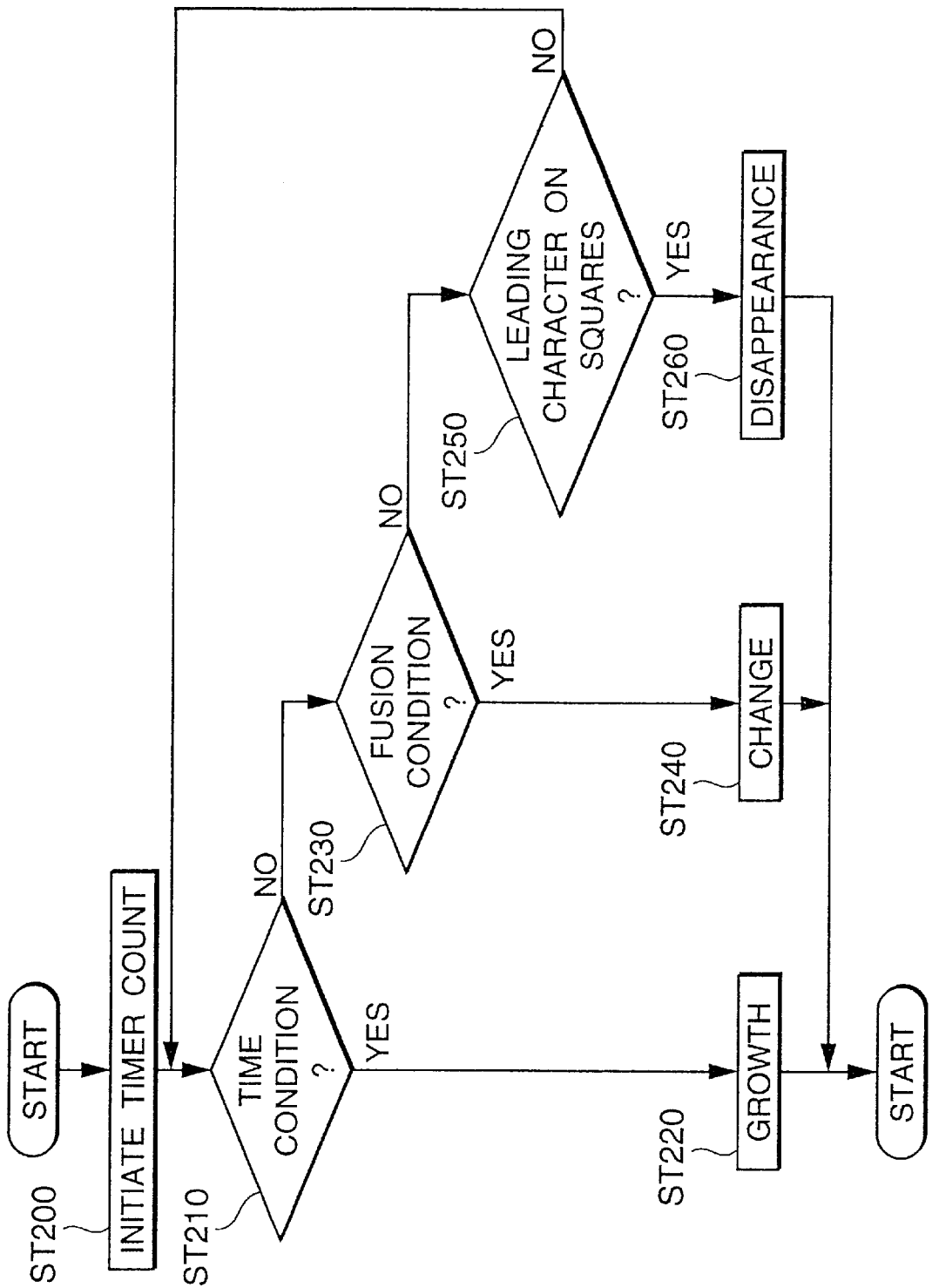
FIG. 15 is a flowchart showing a process of the growth and change of a virus image.

When a virus image is generated in the body of the patient character 25, the process shown in FIG. 15 is initiated. In step ST200, a timer is activated to measure an elapsed time. In step ST210, the process determines whether a time condition is satisfied, in other words, whether a predetermined time has passed. If the time condition has been satisfied ("YES" in step ST210), the virus image grows to become a different enemy character in step ST220, and the process ends.

In step ST210, if the time condition has not been satisfied ("NO" in step ST210), the process determines in step ST230 whether a fusion condition has been satisfied, in other words, whether a virus image exists in adjacent predetermined squares. If the fusion condition has been satisfied ("YES" in step ST230), the two virus images are fused to become a different enemy character in step ST240, and the process ends.

In step ST230, if the fusion condition has not been satisfied ("NO" in step ST230), the process determines whether the leading character 26 has entered the same squares in step ST250. If the leading character 26 has entered the same squares ("YES" in step ST250), the virus image is eliminated in step ST260, and the process ends.

In step ST250, if the leading character 26 has not entered the same squares ("NO" in step ST250), the process returns to step ST210, and the above-described steps are repeatedly performed.

According to the above-described embodiment, the action display section 124 showing a predetermined area including the leading character 26 in the body of the patient character 25, and the patient window 122 showing the patient character 25, are displayed in parallel. Therefore, a movement of the leading character 26 and an action of the patient character 25, which interact with each other, are simultaneously displayed on the monitor 12, whereby the degree of amusement of the video game can be increased.

According to the above-described embodiment, the leading character 26 approaches the virus images 33, whereby the virus images 33 are attacked by a predetermined amount of damage. Therefore, by only moving the leading character 26, the virus images 33 can be quickly defeated, which increases the degree of amusement of the video game.

According to the above-described embodiment, by setting the virus images 33 to become a movable enemy character which cannot be attacked by a predetermined amount of damage unless fighting after a predetermined time elapses from the generation of the enemy character, the ability of the enemy character is enhanced as time elapses when the enemy character is left as it is. Therefore, the degree of amusement of the video game can be increased.

The above-described embodiment uses setting in which in the case where the virus images 33 are generated on predetermined adjacent squares, the virus images 33 are fused to become a movable enemy character which cannot be attacked by a predetermined amount of damage unless fighting. Accordingly, when the virus images 33 are left as they are, the ability of the enemy character is enhanced as time elapses, which can increases the degree of amusement of the video game.

The present invention is not limited to the above-described embodiment, but may employ the following modifications:

(1) In the above-described embodiment, the virus images 33 generated in the body of the patient character 25 are used as an enemy. The present invention is not limited to the above-described embodiment, but may be applied to other ordinary video games. For example, game-element images representing toadstools grown on a mountain path are used, and setting in which a leading character is defeated by a predetermined amount of damage only when the leading character approaches the toadstools may be used.

In addition, the toadstool images may changed to become a movable enemy character which cannot be attacked by a predetermined amount of damage unless using weapon items to perform fighting after a time elapses from the generation of the enemy character. In the case where the toadstool images are generated on predetermined adjacent squares, they may be fused to become a movable enemy character which cannot be attacked by a predetermined amount of damage unless using weapon items to perform fighting. This modification diversifies the video game, similar to the above-described embodiment.

(2) In the above-described embodiment, the virus images 33 generated in the body of the patient character 25 are treated as fixed objects, and are fixedly displayed on the monitor 12. However, the virus images 33 are not limited to the fixed objects, but may be movably displayed on the monitor 12.

What is claimed is:

1. A video game machine comprising:

display means for displaying a video game on a game screen in which a leading character fights to attack enemy characters associated with an associated character;

display control means for displaying said leading character, said enemy characters and said associated character on said game screen;

associated character control means for controlling display of said associated character on said game screen;

operation means for outputting operation signals in accordance with external operations, said operating means including output of operating signals for providing weapon items for use by said leading character;

attack control means for controlling said leading character on the game screen so that said leading character uses said weapon items in accordance with said operation signals to attack said enemy characters, said attack control means also controlling said leading character to damage at least one enemy character without using any of said weapon items; and enemy-character generating means for newly generating said enemy characters at a predetermined position in accordance with an elapsed time;

said attack control means controlling said leading character such that at least one enemy character of said enemy characters is damaged by said leading character without using said weapon items until a predetermined time elapses from the new generation of said enemy characters and such that said at least one enemy character which is damaged by said leading character without said weapon items, cannot be damaged by said leading character without using said weapon items after passage of the predetermined time.

2. A video game machine according to claim 1 comprising means for displaying a virus meter and a leading character power gauge on said game screen.

3. A video game machine according to claim 1, further comprising:

a condition display for displaying a condition of the associated character.

4. A video game machine according to claim 1, wherein the weapon items are one of a medicine item, a nutrient item and an injection item.

5. A video game machine according to claim 1, further comprising enemy-character growth means for growing said enemy characters to become a different type of enemy character after said predetermined time elapses from the generation of said at least one enemy character.

6. A video game machine according to claim 5, further comprising enemy-character-fusion control means for fusing said enemy characters to become a different type of enemy character when said enemy characters are generated in a predetermined area.

7. A video game machine according to claim 5, wherein said associated character is a virtual body of a patient character, said enemy characters representing germs generated in the virtual body of the patient character, said leading character treating said patient character by fighting against said enemy characters in the virtual body of said patient character.

8. A video game machine according to claim 1, further comprising enemy-character-fusion control means for fusing said enemy characters to become a different type of enemy character when said enemy characters are generated in a predetermined area.

9. A video game machine according to claim 8, wherein said associated character is a virtual body of a patient character, said enemy characters representing germs generated in the virtual body of the patient character, said leading character treating said patient character by fighting against said enemy characters in the virtual body of said patient character.

10. A video game machine according to claim 1, wherein said associated character is a virtual body of a patient character, said enemy characters representing germs generated in the virtual body of the patient character, said leading character treating said patient character by fighting against said enemy characters in the virtual body of said patient character.

11. A video-game control method comprising the steps of:

displaying a video game on a game screen;

generating an enemy character on said game screen;

generating a leading character on said game screen wherein said leading character attacks said enemy character;

outputting operation signals in accordance with external operation in which at least some of said operating signals control weapon items for use by said leading character; and controlling said leading character on the game screen so that said leading character uses said weapon items in accordance with said operation signals to attack said enemy characters;

controlling said leading character to damage at least one enemy character without using any of said weapon items;

whereby said enemy character is damaged by said leading character without using said weapon items until a predetermined time elapses from the generation of said enemy character and said enemy character, which is damaged by said leading character without said weapon items, cannot be damaged by said leading character without using said weapon items after passage of the predetermined time.

12. A video-game control method according to claim 11, further comprising the step of growing said enemy character to become a different type of enemy character after said predetermined time elapses from the generation of said enemy character.

13. A computer-readable recording medium containing a video game program for displaying a video game on a game screen in which a leading character existing within a living character fights with and without a weapon item to damage an enemy character existing within the living character, said program comprising the steps of:

generating an enemy character on said game screen;

generating a leading character capable of utilizing a weapon item against said enemy character;

outputting operation signals in which at least some of said operating signals control weapon items for use by said leading character;

controlling said leading character on the game screen so that said leading character uses said weapon items in accordance with said operation signals to attack said enemy characters; and controlling said leading character to damage at least one enemy character without using any of said weapon items;

whereby said enemy character is damaged by said leading character without using said weapon item until a predetermined time elapses from the generation of said enemy character and said enemy character, which is damaged by said leading character without said weapon item, cannot be damaged by said leading character without using said weapon item after passage of the predetermined time.

14. A video game machine comprising:

display means for displaying a video game on a game screen in which a leading character fights to attack enemy characters associated with an associated character;

display control means for displaying said leading character, said enemy characters and said associated character on said game screen;

associated character control means for controlling display of said associated character on said game screen;

operation means for outputting operation signals in accordance with external operation, said operating means including output of operating signals for providing weapon items for use by said leading character;

attack control means for controlling said leading character on the game screen so that said leading character uses said weapon items in accordance with said operation signals to attack said enemy characters, said attack control means also controlling said leading character to damage at least one enemy character without using any of said weapon items; and enemy-character generating means for newly generating said enemy characters in accordance with an elapsed time;

said attack control means permits controlling said leading character to damage at least one enemy character of said enemy characters without using said weapon items until a predetermined time elapses from the new generation of said enemy characters such that said at least one enemy character, which is damaged by said leading character without said weapon items, cannot be further damaged by said leading character without using said weapon items after passage of said predetermined time.

15. A video game machine according to claim 14 wherein said display means comprising one part which includes an action display section for displaying on said game screen said leading character and said enemy characters and another part which includes a window for displaying said associated character on said game screen.

16. A video game machine according to claim 15 comprising a condition display for displaying the condition of the associated character in said window.

17. A video game machine according to claim 15 comprising an associated character controller for controlling the display of the associated character in said window.

18. A video game machine according to claim 17 wherein said associated character controller controls display the physical and mental condition of the associated character in said window.

19. A video game machine according to claim 15 further comprising an associated character selector enabling a game player to select anyone of a plurality of associated characters to be displayed in said window.

20. A video game machine according to claim 19 wherein said associated character selector includes means for displaying on said game screen a plurality of associated characters from which the game player makes said selection.

21. A video game machine according to claim 15 wherein said display means displays said leading character and said enemy characters on said action display section of said game screen using a two-dimensional perspective view and said display means displays said associated character in said window three dimensionally using a plurality of polygon.

22. A video game machine according to claim 14 wherein said attack control means provides for furnishing said weapon items to said associated character and said leading character utilizes said furnished weapons to attack said enemy character.

23. A video game machine according to claim 14 wherein said associated character is a virtual living body and said enemy characters are germs, said weapon items being selected from the group consisting of a nutrient, a medicine and an injection.

24. A video game machine according to claim 14 wherein said associated character is a living character and said display means displays internal organs of said living character.

25. A video game machine according to claim 14 wherein at least one of said weapon items disappears after lapse of a predetermined time.

* * * * *